US011917500B2

(12) United States Patent
Bahrami et al.

(10) Patent No.: US 11,917,500 B2
(45) Date of Patent: Feb. 27, 2024

(54) SYSTEMS AND METHODS FOR PROVIDING VEHICLE SOFTWARE UPDATES

(71) Applicant: Ford Global Technologies, LLC, Dearborn, MI (US)

(72) Inventors: Mohsen Bahrami, Birmingham, MI (US); Navid Tafaghodi Khajavi, Troy, MI (US); Amin Ariannezhad, Troy, MI (US); Elnaz Tavakoli Yazdi, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 93 days.

(21) Appl. No.: 17/206,495

(22) Filed: Mar. 19, 2021

(65) Prior Publication Data

US 2022/0303728 A1    Sep. 22, 2022

(51) Int. Cl.
*H04W 4/06* (2009.01)
*H04W 4/40* (2018.01)
*H04W 28/02* (2009.01)
*H04W 28/06* (2009.01)

(52) U.S. Cl.
CPC ............ *H04W 4/06* (2013.01); *H04W 4/40* (2018.02); *H04W 28/0236* (2013.01); *H04W 28/065* (2013.01)

(58) Field of Classification Search
CPC . H04W 28/065; H04W 28/0236; H04W 4/06; H04W 4/40; H04W 4/02; H04W 4/44; H04W 24/02; G06F 8/65; G06F 8/71
See application file for complete search history.

(56) References Cited

U.S. PATENT DOCUMENTS

| 8,688,101 | B1* | 4/2014 | Hayes | H04W 4/40 455/448 |
| 10,140,110 | B2 | 11/2018 | Vangelov et al. | |
| 2008/0233967 | A1* | 9/2008 | Montojo | H04W 72/541 455/452.2 |
| 2017/0170936 | A1* | 6/2017 | Sundararajan | H04W 28/0236 |
| 2017/0272966 | A1* | 9/2017 | Scahill | H04J 11/005 |
| 2017/0353350 | A1 | 12/2017 | Gussen et al. | |
| 2019/0102158 | A1* | 4/2019 | Thanayankizil | H04W 8/245 |
| 2020/0413329 | A1* | 12/2020 | Nishizaki | H04W 4/026 |

FOREIGN PATENT DOCUMENTS

| DE | 102012001047 | 7/2013 |
| WO | 2019096840 | 5/2019 |

* cited by examiner

*Primary Examiner* — Ricardo H Castaneyra
(74) *Attorney, Agent, or Firm* — Burris Law, PLLC

(57) ABSTRACT

A method includes identifying a broadcast set of access points from among the plurality of access points based on access point interference data associated with a plurality of access points disposed in an environment, where the access point interference data includes current radio frequency (RF) signal interference data associated with each of the plurality of access points, predicted RF signal interference data associated with each of the plurality of access points, or a combination thereof. The method includes partitioning a data packet into a plurality of data subpackets based on the broadcast set of access points and broadcasting the plurality of data subpackets to a vehicle via the broadcast set of access points.

20 Claims, 4 Drawing Sheets

SYSTEMS AND METHODS FOR PROVIDING VEHICLE SOFTWARE UPDATES

FIELD

The present disclosure relates to a system and/or method for managing and providing software updates to a vehicle.

BACKGROUND

The statements in this section merely provide background information related to the present disclosure and may not constitute prior art.

In a manufacturing environment, wireless communication devices are utilized in various manufacturing processes. As an example, wireless communication devices may broadcast or receive various types of data (e.g., operational data, status data, among others) to/from a remote computing system, a static/autonomous robot, a machining cell, other wireless communication devices, among others. The wireless communication devices may utilize radio frequency (RF) signals and, more particularly, defined communication channels of an RF spectrum to broadcast or receive the data. However, signal interference and noise pollution can inhibit the transmission or reception of RF signals in the manufacturing environment. These issues with signal interference and noise pollution, among other issues, are addressed by the present disclosure.

SUMMARY

This section provides a general summary of the disclosure and is not a comprehensive disclosure of its full scope or all of its features.

The present disclosure provides a method that includes identifying a broadcast set of access points from among the plurality of access points based on access point interference data associated with a plurality of access points disposed in an environment, where the access point interference data includes current radio frequency (RF) signal interference data associated with each of the plurality of access points, predicted RF signal interference data associated with each of the plurality of access points, or a combination thereof. The method includes partitioning a data packet into a plurality of data subpackets based on the broadcast set of access points and broadcasting the plurality of data subpackets to a vehicle via the broadcast set of access points.

In some forms, the current RF signal interference data is based on an RF signal interference proximate a location of a given access point from among the plurality of access points.

In some forms, the current RF signal interference data is based on a radiation map associated with each access point from among the plurality of access points.

In some forms, the method further includes identifying one or more overlapping regions of each radiation map and identifying an interfering set of access points from among the plurality of access points based on the one or more overlapping regions.

In some forms, the broadcast set of access points are identified as remaining access points among the plurality of access points not identified as the interfering set of access points.

In some forms, the predicted RF signal interference data is based on one or more prior RF signal interferences proximate a location of a given access point from among the plurality of access points.

In some forms, the method further includes determining a number of access points of the broadcast set of access points, where a number of the plurality of data subpackets broadcasted to the vehicle is equal to the number of access points of the broadcast set of access points.

In some forms, the broadcast set of access points is identified based on location data associated with the vehicle.

In some forms, the vehicle and the broadcast set of access points are configured to communicate using one of a BLUETOOTH-type protocol, a cellular protocol, a wireless fidelity-type protocol, a near-field communication protocol, and an ultra-wideband protocol.

The present disclosure provides a system including a processor and a nontransitory computer-readable medium including instructions that are executable by the processor. The instructions include identifying an interfering set of access points from among a plurality of access points based on access point interference data associated with the plurality of access points disposed in an environment, where the access point interference data includes current radio frequency (RF) signal interference data associated with each of the plurality of access points, predicted RF signal interference data associated with each of the plurality of access points, or a combination thereof. The instructions include partitioning a data packet into a plurality of data subpackets based on the broadcast set of access points and broadcasting the plurality of data subpackets to a vehicle via the broadcast set of access points.

In some forms, the current RF signal interference data is based on an RF signal interference proximate a location of a given access point from among the plurality of access points.

In some forms, the current RF signal interference data is based on a radiation map associated with each access point from among the plurality of access points.

In some forms, the instructions further include identifying one or more overlapping regions of each radiation map, where the interfering set of access points is identified based on the one or more overlapping regions.

In some forms, the predicted RF signal interference data is based on one or more prior RF signal interferences proximate a location of a given access point from among the plurality of access points.

In some forms, the instructions further comprise determining a number of access points of the broadcast set of access points, where a number of the plurality of data subpackets broadcasted to the vehicle is equal to the number of access points of the broadcast set of access points.

In some forms, the vehicle and the broadcast set of access points are configured to communicate using one of a BLUETOOTH-type protocol, a cellular protocol, a wireless fidelity-type protocol, a near-field communication protocol, and an ultra-wideband protocol.

The present disclosure provides a method including identifying one or more overlapping regions based on a radiation map associated with each access point from among a plurality of access points, identifying an interfering set of access points from among the plurality of access points based on the one or more overlapping regions, and identifying a broadcast set of access points from among the plurality of access points based on the interfering set of access points. The method includes partitioning a data packet into a plurality of data subpackets based on the broadcast set of access points and broadcasting the plurality of data subpackets to a vehicle via the broadcast set of access points.

In some forms, the method further includes identifying the interfering set of access points based on predicted RF signal interference data, where the predicted RF signal interference data is based on one or more prior RF signal interferences proximate a location of a given access point from among the plurality of access points.

In some forms, the method further includes determining a number of access points of the broadcast set of access points, where a number of the plurality of data subpackets broadcasted to the vehicle is equal to the number of access points of the broadcast set of access points.

In some forms, the vehicle and the broadcast set of access points are configured to communicate using one of a BLUETOOTH-type protocol, a cellular protocol, a wireless fidelity-type protocol, a near-field communication protocol, and an ultra-wideband protocol.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
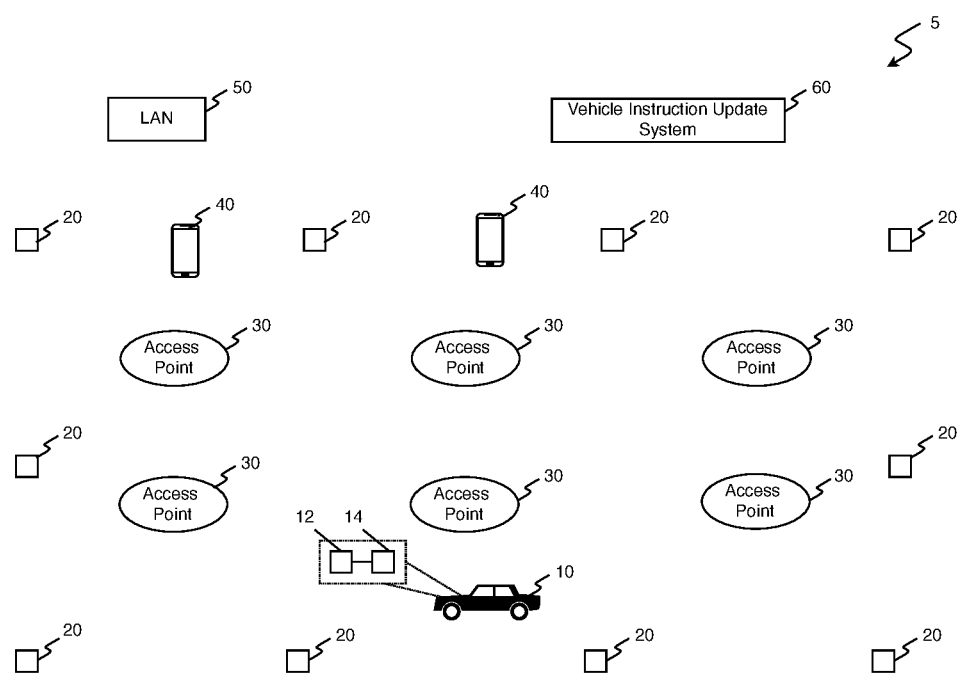
FIG. 1 illustrates a functional block diagram of a manufacturing environment in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a vehicle instruction update system that identifies a broadcast set of access points based on current radio frequency signal interference data and/or predicted radio frequency signal interference data. The vehicle instruction update system partitions the data packet into a plurality of data subpackets and broadcasts the plurality of data subpackets to a vehicle via the broadcast set of access points. By accounting for the radio frequency interference within a manufacturing environment, the vehicle instruction update system described can provide over the air software updates to vehicles with increased reliability and reduced latency.

Referring to FIG. 1, a manufacturing environment 5 for manufacturing a vehicle 10 is provided. The manufacturing environment 5 generally includes radio frequency (RF) sensors 20, access points 30, wireless communication devices 40, a local area network (LAN) 50, and a vehicle instruction update system (VIUS) 60. While the VIUS 60 is illustrated as part of the manufacturing environment 5, it should be understood that the VIUS 60 may be positioned remotely from the manufacturing environment 5. In one form, the RF sensors 20, the access points 30, the wireless communication devices 40, and the VIUS 60 are communicably coupled using a wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, among others).

In one form, the vehicle 10 includes location sensors 12 and a control module 14. In one form, the location sensors 12 are configured to provide location data of the vehicle 10 to the VIUS 60 via the control module 14. As an example, the location sensors 12 may include, but are not limited to: a global navigation satellite system (GNSS) sensor, an indoor positioning system sensor, among other location sensors.

In one form, the control module 14 is configured to control various functions of the vehicle 10. As an example, the control module 14 is configured to autonomously navigate the vehicle 10 within the manufacturing environment 5 based on the location data provided by the location sensors 12 and/or other known path planning routines. As another example, the control module 14 is configured to request and receive software updates from the VIUS 60 via a set of the access points 30, as described below in further detail. The term "software update" may be interchangeably referred to herein as "data packets."

In one form, the RF sensors 20 provide signal strength information of RF signals transmitted by the wireless communication devices 40 to the VIUS 60. The RF sensors 20 may include, but are not limited to: diode detector-based RF sensors, thermistor RF power sensors, thermocouple RF power sensors, among others. In one form, the signal strength may be represented by any suitable metric indicative of signal strength, including, but not limited to: a power ratio in decibels of the message (dBm), a power spectral density of the message (dBm/MHz), a packet error rate (PER) a signal-to-noise ratio (SNR), among other representations of the signal strength.

In one form, the RF sensors 20 provide identification information of the RF sensors 20 along with the signal strength information to the VIUS 60. In one form, the identification information includes data that uniquely identifies the corresponding RF sensor 20 and/or the location thereof. Based on the identification and signal strength information, the VIUS 60 generates current RF signal interference data, as described below in further detail with reference to FIG. 2A.

In one form, the access points 30 are networking devices that enable the wireless communication devices 40 to establish a communication link with the LAN 50 using the wireless communication protocols described above. In one form, the access points 30 provide a gateway for transmitting data packets from the VIUS 60 to the vehicle 10, as described below in further detail. As an example, the access points 30 include, but are not limited to, a Wi-Fi-type router, a Wi-Fi-type signal booster/extender, among others.

In one form, RF sensors 20 and the access points 30 are disposed at various fixed infrastructure elements of the manufacturing environment 5 including, but not limited to: an overhead beam, a tower, a light pole, a building, a sign, a machining device, a stationary storage rack/shelving system, among other fixed elements of the manufacturing environment 5. It should be understood that the RF sensors 20 and/or the access points 30 may be disposed at various moveable elements of the manufacturing environment 5 in other forms.

In one form, the wireless communication devices 40 are computing devices that utilize a wireless communication protocol to perform and/or assist a manufacturing operation. The computing devices may include, but are not limited to, a computer, laptop, smartphone, tablet, personal digital assistant (PDA), special purpose controllers for specific manufacturing operations, among others. As an example, the wireless communication devices 40 are computing devices disposed at partially or fully-autonomous vehicles that are configured to autonomously move to various locations of the manufacturing environment 5, such as, but not limited to: mobile robots, mobile workstations, drones, and/or automated guided vehicles, among other autonomous devices. As another example, the wireless communication devices 40 are computing devices disposed on a machining apparatus, such as a computer numerically controlled (CNC) machine. It should be understood that the wireless communication devices 40 may be other suitable devices performing various other operations and are not limited to the examples described herein.

Figure 2A:
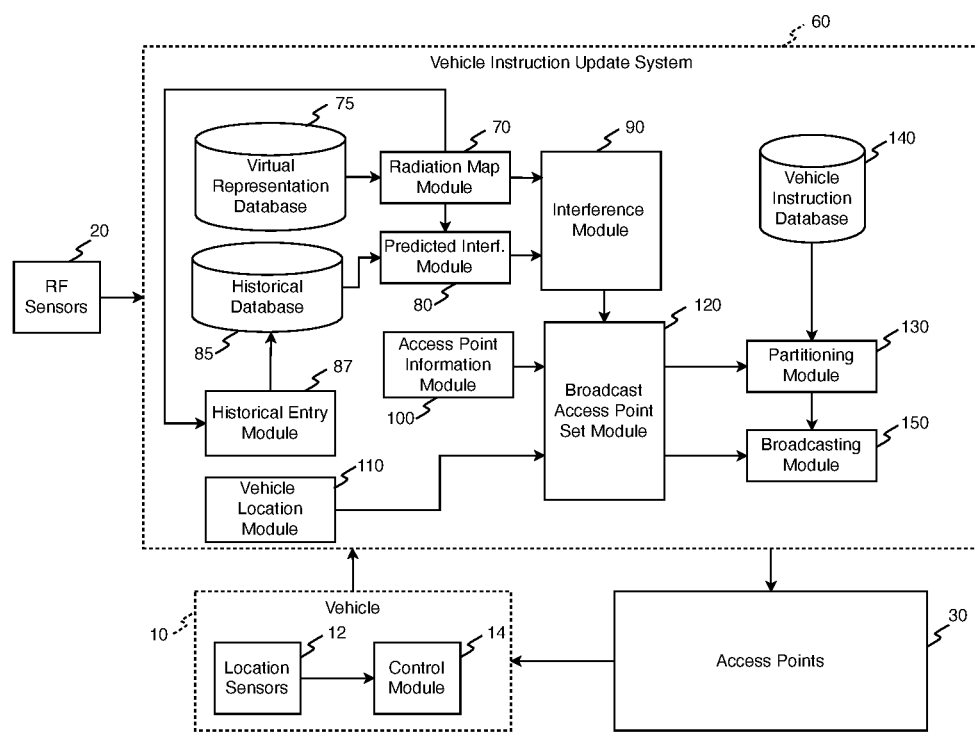
FIG. 2A illustrates a functional block diagram of a vehicle instruction update system in accordance with the teachings of the present disclosure.

Referring to FIG. 2A, the VIUS 60 includes a radiation map module 70, a virtual representation database 75, a predicted interference module 80, a historical database 85, a historical entry module 87, an interference module 90, an access point information module 100, a vehicle location module 110, a broadcast access point set module (BAPSM) 120, a partitioning module 130, a vehicle instruction database 140, and a broadcasting module 150. It should be readily understood that any one of the components of the VIUS 60 can be provided at the same location or distributed at different locations (e.g., via one or more edge computing devices) and communicably coupled accordingly. While the virtual representation database 75, the historical database 85, and the vehicle instruction database 140 are illustrated as separate databases, it should be understood that any one of these databases may be selectively combined with another database in other forms.

In one form, the radiation map module 70 is configured to generate current RF signal interference data based on an RF signal interference proximate (i.e., adjacent and/or near) the access points 30. In one form, the current RF signal interference proximate the access points 30 may be caused by wireless communication between the access points 30, the wireless communication devices 40, the vehicle 10, and/or other devices or systems within the manufacturing environment 5.

In one form, the radiation map module 70 generates radiation maps for each of the access points 30 to assess the current RF signal interference, where the radiation maps are digital representations of a range in which the respective access points 30 broadcast signals. In one form, the radiation map module 70 generates the radiation maps based on the RF signal magnitudes obtained by the RF sensors 20, identification information associated with the RF sensors 20, and/or a virtual representation of the manufacturing environment 5 stored in the virtual representation database 75.

Figure 2B:
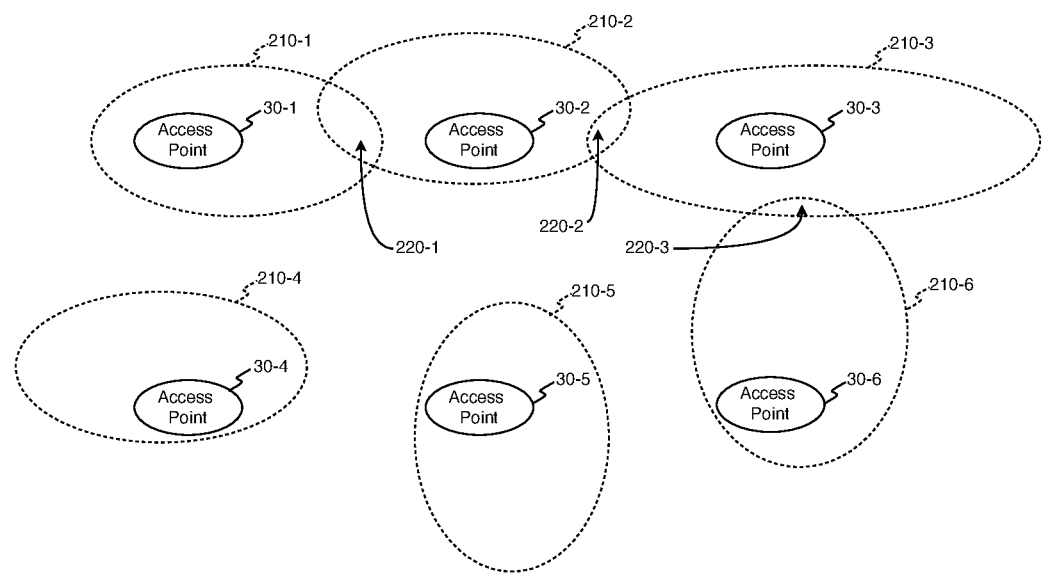
FIG. 2B illustrates radiation maps of a plurality of access points in accordance with the teachings of the present disclosure.

As an example, referring to FIG. 2B, the radiation map module 70 generates radiation maps 210-1, 210-2, 210-3, 210-4, 210-5, 210-6 (collectively referred to as "radiation maps 210") for access points 30-1, 30-2, 30-3, 30-4, 30-5, 30-6, respectively (collectively referred to as "the access points 30"). While the radiation maps 210 are illustrated as a two-dimensional representations, it should be understood that the radiation maps 210 may be three-dimensional representations in other forms.

In one form, the predicted interference module 80 identifies predicted RF signal interference data associated with the access points 30 based on one or more historical entries stored in the historical database 85. In one form, each historical entry identifies, for a given access point 30, a prior RF signal interference proximate the given access point 30. As an example, the historical entry may include a predicted radiation map that is generated based on one or more prior radiation maps generated by the radiation map module 70. In some forms, the historical entry module 87 is configured to generate the historical entries based on one or more prior radiation maps generated by the radiation map module 70 by performing machine-learning routines, deep neural network routines, convolutional neural network routines, or other routines that predict ranges of signals broadcasted by the respective access points 30.

In one form, the interference module 90 determines a presence of RF signal interference based on the current RF signal interference data and/or the predicted RF signal interference data. In one form, the interference module 90 determines the presence of RF signal interference by identifying overlapping regions of the radiation maps generated by the radiation map module 70. As an example, referring to FIG. 2B, the interference module 90 identifies an overlapping region 220-1 associated with the radiation maps 210-1, 210-2, an overlapping region 220-2 associated with the radiation maps 210-2, 210-3, and an overlapping region 220-3 associated with the radiation maps 210-3, 210-6. As such, the interference module 90 determines RF signal interference is present between the access points 30-1, 30-2, the access points 30-2, 30-3, and the access points 30-3, 30-6. While FIG. 2B illustrates the overlapping regions 220-1, 220-2, 220-3 identified by the interference module 90, it should be understood that the interference module 90 may predict the presence of RF interference at a given time based on the predicted RF signal interference data generated by the predicted interference module 80 in a similar manner.

In one form, the access point information module 100 provides characteristic data of the access points 30. As an example, the characteristic data may include, but is not limited to: location data of the access points 30, transmission performance metrics of the access points 30 (e.g., the transmission performance rate of the access point 30-1 for a subpacket of data is 96% when the vehicle 10 is within a given distance of the access point 30-1), and predefined rules associated with the access points 30. For example, the predefined rules may include identification rules prohibiting or mandating the identification of various combinations of access points 30 as part of a broadcast set of access points 30 (e.g., one or more access points 30), as described below in further detail. As another example, the predefined rules may include priority rules that prioritize a set of access points 30 based on a type of the vehicle 10, a number of vehicles 10, a type of software update requested by the vehicle 10, among others. It should be understood that various types of rules can be implemented and are not limited to the examples provided herein.

In one form, the vehicle location module 110 identifies a current location and/or path of the vehicle 10 based on the location data from the location sensors 12 and/or path planning information from the control module 14.

In one form, the BAPSM 120 may identify a broadcast set of the access points 30 based on an interfering set of access points 30 indicated by the interference module 90, the characteristic data provided by the access point information module 100, and/or the current location/path of the vehicle 10 provided by the vehicle location module 110.

In one form, to identify the broadcast set, the BAPSM 120 may initially identify an interfering set of access points 30 based on the overlapping regions indicated by the access point interference data (i.e., the current RF signal interference data and/or the predicted RF signal interference data). As an example, referring to FIG. 2B, the BAPSM 120 may identify the interfering set to only include the access points 30-1, 30-2 based on the overlapping region 220-1. As another example, the BAPSM 120 may identify the interfering set to only include the access points 30-2, 30-3 based on the overlapping region 220-2. As an additional example, the BAPSM 120 may identify the interfering set to only include the access points 30-3, 30-6 based on the overlapping region 220-3.

In one form, the BAPSM 120 identifies the access points that are not part of the interfering set as part of the broadcast set of access points. As an example, if the interfering set only includes the access points 30-1, 30-2 the BAPSM 120 may designate the access points 30-3, 30-4, 30-5, 30-6 as part of the broadcast set of access points 30. As another example, if the interfering set only includes the access points 30-2, 30-3 the BAPSM 120 may designate the access points 30-1, 30-4, 30-5, 30-6 as part of the broadcast set of access points 30. As an additional example, if the interfering set only includes the access points 30-3, 30-6 the BAPSM 120 may designate the access points 30-1, 30-2, 30-4, 30-5 as part of the broadcast set of access points 30. In yet another example, if the interfering set includes the access points 30-1, 30-2, 30-3 and 30-6, the BAPSM 120 designates the access points 30-4, 30-5 as part of the broadcast set of access points 30.

As described above, the BAPSM 120 may identify multiple broadcast sets of access points 30 for a given set of interfering access points. As an example, when an interfering set includes access points 30-1, 30-2, the BAPSM 120 may identify eleven possible broadcast sets of the access points 30-3, 30-4, 30-5, 30-6. More specifically, when the BAPSM 120 may identify six possible broadcast sets including only two of the access points 30-3, 30-4, 30-5, 30-6, four possible broadcast sets including only three of the access points 30-3, 30-4, 30-5, 30-6, and one possible broadcast set including all four of the access points 30-3, 30-4, 30-5, 30-6. As such, the BAPSM 120 may be configured to select one broadcast set from among the multiple possible broadcast sets. In one form, the broadcast set is selected based on the characteristic data provided by the access point information module 100 and/or the current location/path of the vehicle 10 provided by the vehicle location module 110. As an example, if a distance between one of the access points 30 of a given broadcast set and a current location of the vehicle 10 is greater than a predefined distance (as indicated by the access point information data), the BAPSM 120 may not select the given broadcast set. As such, in one form, the BAPSM 120 may be configured to select a given broadcast set from among the multiple possible broadcast sets if the distance between each access point 30 and the current location of the vehicle 10 is less than the predefined distance. In one form, the broadcast set is selected based on a random selection from among the multiple possible broadcast sets.

As another example, if the transmission performance rate of one of the access points 30 of a given broadcast set is less than a predefined value as indicated by the access point information data, the BAPSM 120 may not select the given broadcast set. As an example, when an interfering set includes access points 30-1, 30-2, and when the transmission performance rate access point 30-3 is less than the predefined value, the BAPSM 120 may a broadcast set having at least two of access points 30-4, 30-5, 30-6 and not including the access point 30-3. As such, in one form, the BAPSM 120 may be configured to select a given broadcast set from among the multiple broadcast sets if the transmission performance rate between each access point 30 of the given broadcast set is greater than the predefined value.

In one form, the partitioning module 130 is configured to partition a data packet from the vehicle instruction database 140 (e.g., software requested by the vehicle 10) into a plurality of data subpackets based on the broadcast set of access points. In one form, the partitioning module 130 may determine a number of access points 30 of the broadcast set and generate a number of data subpackets that is equal to the number of access points 30 of the broadcast set. As an example, if the broadcast set includes four access points 30 (e.g., the access points 30-1, 30-4, 30-5, 30-6), the partitioning module 130 may partition the requested data packet into four partitions.

In one form, the broadcasting module 150 broadcasts the data subpackets to the vehicle 10 via the broadcast set of access points identified by the BAPSM 120. As an example, if the broadcast set includes the access points 30-1, 30-4, 30-5, 30-6, the broadcast module 150 may broadcast a first data subpacket to the vehicle 10 via access point 30-1, a second data subpacket to the vehicle 10 via access point 30-4, a third data subpacket to the vehicle 10 via access point 30-5, and a fourth data subpacket to the vehicle 10 via access point 30-6.

Figure 3:
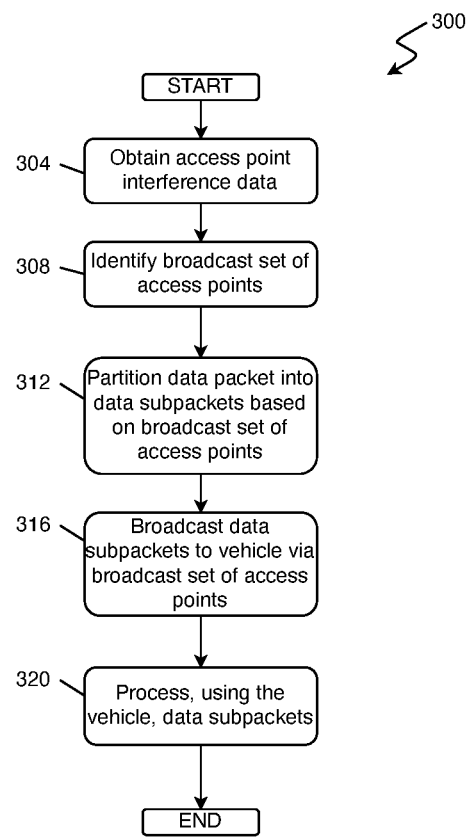
FIG. 3 is a flowchart of an example control routine in accordance with the teachings of the present disclosure.

With reference to FIG. 3, a routine 300 for updating the software of the vehicle 10 is shown. At 304, the VIUS 60 obtains the access point interference data (i.e., the current RF signal interference data and/or the predicted RF signal interference data). At 308, the VIUS 60 identifies a broadcast set of access points 30 based on the access point interference data. As an example, the VIUS 60 identifies the broadcast set of access points 30 as the remaining access points not identified as the interfering set of access points 30, as described above. At 312, the VIUS 60 partitions the data packet into data subpackets based on the broadcast set of access points 30. As an example, if there are four access points 30 identified in the broadcast set, the VIUS 60 partitions the data packet into four subpackets. At 316, the VIUS 60 broadcasts the data subpackets to the vehicle 10 via the broadcast set of access points 30.

At 320, the vehicle 10 processes the data subpackets. As an example, the control module 14 of the vehicle 10 is configured to reassemble the data subpackets received from the VIUS 60 via the broadcast set of access points 30 and update the control module 14 and/or other modules of the vehicle 10.

As such, when transmitting software and/or software updates to the vehicle 10, the VIUS 60 accounts for the RF interference within the manufacturing environment 5 and partitions the data packets accordingly. Therefore, the VIUS 60 provides the data packets to vehicles with increased reliability, reduced latency, and an improved data load distribution among the access points 30.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term controller may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality, such as, but not limited to, movement drivers and systems, transceivers, routers, input/output interface hardware, among others; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

What is claimed is:

1. A method comprising:
identifying a plurality of broadcast sets of access points from among a plurality of access points based on predicted radio frequency (RF) signal interference data associated with the plurality of access points disposed in an environment, wherein the predicted RF signal interference data includes one or more historical entries that identify a prior RF signal interference proximate an access point of the plurality of access points, and wherein the one or more historical entries are generated via performance of a machine-learning routine, a deep neural network routine, a convolutional neural network routine, or a combination thereof;
selecting a broadcast set of access points from among the plurality of broadcast sets of access points based on characteristic data associated with the plurality of broadcast sets of access points, wherein the characteristic data indicates a transmission performance rate of each access point from among the plurality of broadcast sets of access points and priority rules associated with the broadcast sets of access points;
partitioning a data packet into a plurality of data subpackets based on the broadcast set of access points; and
broadcasting the plurality of data subpackets to a vehicle via the broadcast set of access points.

2. The method of claim 1, wherein the one or more historical entries include a predicted radiation map.

3. The method of claim 2, wherein the predicted radiation map is generated based on a radiation map associated with each access point from among the plurality of access points.

4. The method of claim 3 further comprising:
identifying one or more overlapping regions of each radiation map; and
identifying an interfering set of access points from among the plurality of access points based on the one or more overlapping regions.

5. The method of claim 4, wherein the broadcast set of access points are identified as remaining access points among the plurality of access points not identified as the interfering set of access points.

6. The method of claim 1, wherein the predicted RF signal interference data is based on one or more prior RF signal interferences proximate a location of a given access point from among the plurality of access points.

7. The method of claim 1 further comprising determining a number of access points of the broadcast set of access points, wherein a number of the plurality of data subpackets broadcasted to the vehicle is equal to the number of access points of the broadcast set of access points.

8. The method of claim 1, wherein the broadcast set of access points is identified based on location data associated with the vehicle.

9. The method of claim 1, wherein the vehicle and the broadcast set of access points are configured to communicate using one of a BLUETOOTH-type protocol, a cellular protocol, a wireless fidelity-type protocol, a near-field communication protocol, and an ultra-wideband protocol.

10. A system comprising:
a processor; and
a nontransitory computer-readable medium including instructions that are executable by the processor, wherein the instructions include:
identifying an interfering set of access points from among a plurality of access points based on predicted radio frequency (RF) signal interference data associated with the plurality of access points disposed in an environment, wherein the predicted RF signal interference data includes one or more historical entries that identify a prior RF signal interference proximate an access point of the plurality of access points, and wherein the one or more historical entries are generated via performance of a machine-learning routine, a deep neural network routine, a convolutional neural network routine, or a combination thereof;

identifying a plurality of broadcast sets of access points from among the plurality of access points based on the interfering set of access points;

selecting a broadcast set of access points from among the plurality of broadcast sets of access points based on characteristic data associated with the plurality of broadcast sets of access points, wherein the characteristic data indicates a transmission performance rate of each access point from among the plurality of broadcast sets of access points and priority rules associated with the broadcast sets of access points;

partitioning a data packet into a plurality of data subpackets based on the broadcast set of access points; and broadcasting the plurality of data subpackets to a vehicle via the broadcast set of access points.

11. The system of claim 10, wherein the one or more historical entries include a predicted radiation map.

12. The system of claim 11, wherein the predicted radiation map is generated based on a radiation map associated with each access point from among the plurality of access points.

13. The system of claim 12, wherein the instructions further comprise identifying one or more overlapping regions of each radiation map, wherein the interfering set of access points is identified based on the one or more overlapping regions.

14. The system of claim 10, wherein the predicted RF signal interference data is based on one or more prior RF signal interferences proximate a location of a given access point from among the plurality of access points.

15. The system of claim 10, wherein the instructions further comprise determining a number of access points of the broadcast set of access points, wherein a number of the plurality of data subpackets broadcasted to the vehicle is equal to the number of access points of the broadcast set of access points.

16. The system of claim 10, wherein the vehicle and the broadcast set of access points are configured to communicate using one of a BLUETOOTH-type protocol, a cellular protocol, a wireless fidelity-type protocol, a near-field communication protocol, and an ultra-wideband protocol.

17. A method comprising:
identifying one or more overlapping regions based on a radiation map associated with each access point from among a plurality of access points;

identifying an interfering set of access points from among the plurality of access points based on the one or more overlapping regions;

identifying a plurality of broadcast sets of access points from among the plurality of access points based on the interfering set of access points and predicted radio frequency (RF) signal interference data, wherein the predicted RF signal interference data includes one or more historical entries that identify a prior RF signal interference proximate an access point of the plurality of access points, and wherein the one or more historical entries are generated via performance of a machine-learning routine, a deep neural network routine, a convolutional neural network routine, or a combination thereof;

selecting a broadcast set of access points from among the plurality of broadcast sets of access points based on characteristic data associated with the plurality of broadcast sets of access points, wherein the characteristic data indicates a transmission performance rate of each access point from among the plurality of broadcast sets of access points and priority rules associated with the broadcast sets of access points;

partitioning a data packet into a plurality of data subpackets based on the broadcast set of access points; and broadcasting the plurality of data subpackets to a vehicle via the broadcast set of access points.

18. The method of claim 17, wherein the one or more historical entries include a predicted radiation map, and wherein the predicted radiation map is generated based on the radiation map.

19. The method of claim 17 further comprising determining a number of access points of the broadcast set of access points, wherein a number of the plurality of data subpackets broadcasted to the vehicle is equal to the number of access points of the broadcast set of access points.

20. The method of claim 17, wherein the vehicle and the broadcast set of access points are configured to communicate using one of a BLUETOOTH-type protocol, a cellular protocol, a wireless fidelity-type protocol, a near-field communication protocol, and an ultra-wideband protocol.

* * * * *